(12) United States Patent
Cronin

(10) Patent No.: US 6,980,206 B2
(45) Date of Patent: Dec. 27, 2005

(54) RENDERING A THREE-DIMENSIONAL MODEL USING A DITHER PATTERN

(75) Inventor: Thomas M. Cronin, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 316 days.

(21) Appl. No.: 09/878,051

(22) Filed: Jun. 7, 2001

(65) Prior Publication Data

US 2002/0186215 A1 Dec. 12, 2002

(51) Int. Cl.[7] .............................................. G06T 15/00
(52) U.S. Cl. ...................................................... 345/419
(58) Field of Search .......................... 345/419; 382/103

(56) References Cited

U.S. PATENT DOCUMENTS

| | | | |
|---|---|---|---|
| 3,739,082 A | 6/1973 | Lippel | 348/574 |
| 4,460,924 A * | 7/1984 | Lippel | 386/44 |
| 4,600,919 A | 7/1986 | Stern | 345/473 |
| 4,747,052 A | 5/1988 | Hishinuma et al. | 250/587 |
| 4,835,712 A | 5/1989 | Drebin et al. | 345/423 |
| 4,855,934 A | 8/1989 | Robinson | 345/582 |
| 4,901,064 A | 2/1990 | Deering | 345/926 |
| 5,124,914 A | 6/1992 | Grangeat | 348/50 |
| 5,163,126 A | 11/1992 | Einkauf et al. | 345/423 |
| 5,371,778 A | 12/1994 | Yanof et al. | 378/4 |
| 5,573,402 A * | 11/1996 | Gray | 434/69 |
| 5,611,030 A | 3/1997 | Stokes | 345/590 |
| 5,731,819 A | 3/1998 | Gagne et al. | 345/647 |
| 5,757,321 A | 5/1998 | Billyard | 345/426 |
| 5,786,822 A | 7/1998 | Sakaibara | 345/582 |
| 5,805,782 A | 9/1998 | Foran | 345/426 |
| 5,809,219 A | 9/1998 | Pearce et al. | 345/426 |
| 5,812,141 A | 9/1998 | Kamen et al. | 345/587 |
| 5,836,813 A * | 11/1998 | Miyata et al. | 382/103 |
| 5,838,813 A * | 11/1998 | Kancler et al. | 382/103 |
| 5,847,712 A | 12/1998 | Salesin et al. | 345/582 |
| 5,894,308 A | 4/1999 | Isaacs | 345/420 |

(Continued)

OTHER PUBLICATIONS

Appel, Arthur, "The Notion of Quantitative Invisibility and the Machine Rendering of Solids." Proceedings of 22nd National Conference Association for Computing Machinery 1967.

Buck et al., "Performance–Driven Hand Drawn Animation", *ACM* (NPAR2000), pp. 101–108 (2000).

(Continued)

*Primary Examiner*—Tuyet Vo
*Assistant Examiner*—Huedung X. Cao
(74) *Attorney, Agent, or Firm*—Fish & Richardson P.C.

(57) ABSTRACT

Rendering a three-dimensional model includes obtaining a characteristic of the three-dimensional model, determining a three-dimensional dither pattern based on the characteristic, and rendering the three-dimensional model using the three-dimensional dither pattern. Determining the three-dimensional dither pattern may include selecting a number of points to make up the dither pattern and a location of the points on the three-dimensional model.

27 Claims, 3 Drawing Sheets

U.S. PATENT DOCUMENTS

| | | | |
|---|---|---|---|
| 5,926,401 A * | 7/1999 | Montag et al. | 703/5 |
| 5,929,860 A | 7/1999 | Hoppe | 345/419 |
| 5,933,148 A | 8/1999 | Oka et al. | 345/427 |
| 5,949,969 A | 9/1999 | Suzuoki et al. | 358/1.17 |
| 5,966,133 A | 10/1999 | Hoppe | 345/420 |
| 5,966,134 A | 10/1999 | Arias | 345/589 |
| 5,974,423 A | 10/1999 | Margolin | 345/606 |
| 6,054,999 A | 4/2000 | Strandberg | 345/474 |
| 6,057,859 A | 5/2000 | Handelman et al. | 345/474 |
| 6,078,331 A | 6/2000 | Pulli et al. | 345/423 |
| 6,115,050 A | 9/2000 | Landau et al. | 345/619 |
| 6,175,655 B1 | 1/2001 | George et al. | 382/257 |
| 6,191,787 B1 | 2/2001 | Lu et al. | 345/418 |
| 6,191,796 B1 | 2/2001 | Tarr | 345/581 |
| 6,198,486 B1 | 3/2001 | Junkins et al. | 345/415 |
| 6,201,549 B1 | 3/2001 | Bronskill | 345/441 |
| 6,208,347 B1 | 3/2001 | Migdal et al. | 345/415 |
| 6,219,070 B1 | 4/2001 | Baker et al. | 345/475 |
| 6,239,808 B1 | 5/2001 | Kirk et al. | 345/582 |
| 6,252,608 B1 | 6/2001 | Snyder et al. | 345/473 |
| 6,262,737 B1 | 7/2001 | Li et al. | 345/419 |
| 6,262,739 B1 | 7/2001 | Migdal et al. | 345/423 |
| 6,292,192 B1 | 9/2001 | Moreton | 345/586 |
| 6,317,125 B1 | 11/2001 | Persson | 345/423 |
| 6,337,880 B1 | 1/2002 | Cornog et al. | 375/240.01 |
| 6,388,670 B2 | 5/2002 | Naka et al. | 345/474 |
| 6,405,071 B1 | 6/2002 | Analoui | 600/425 |
| 6,437,782 B1 | 8/2002 | Pieragostini et al. | 345/426 |
| 6,478,680 B1 | 11/2002 | Yoshioka et al. | 463/43 |
| 6,559,848 B2 | 5/2003 | O'Rourke | 345/473 |
| 6,593,924 B1 | 7/2003 | Lake et al. | 345/426 |
| 6,593,927 B2 | 7/2003 | Horowitz et al. | 345/473 |
| 6,608,627 B1 | 8/2003 | Marshall et al. | 345/619 |
| 6,608,628 B1 | 8/2003 | Ross et al. | 345/619 |
| 2001/0026278 A1 | 10/2001 | Arai et al. | 345/474 |
| 2002/0101421 A1 | 8/2002 | Pallister | |

OTHER PUBLICATIONS

Catmull et al., "Recursively Generated B–Spline Surfaces on Arbitrary Topological Meshes," Computer Aided Design, 10(6):350–355 (1978).

Coelho et al., "An Algorithm for Intersecting and Trimming Parametric Meshes", *ACM* SIGGRAPH, pp. 1–8 (1998).

Deering, M., "Geometry Compression," *Computer Graphics*. SIGGRAPH '95, pp. 13–20, 1995.

DeRose et al., "Subdivisional Surfaces in Character Animation", *ACM*, SIGGRAPH'98, pp. 85–94 (1998).

Elber, Gershon, "Interactive Line Art Rendering of Freeform Surfaces", *Eurographics'99*, 18(3):C1–C12 (1999).

Gooch et al., "A Non–Photorealistic Lighting Model for Automatic Technical Illustration," *Computer Graphics Proceedings, Annual Conference Series, SIGGRAPH'98*, pp. 447–452(1998).

Gooch et al., "Interactive Technical Illustration," *ACM Interactive 3D*, pp. 31–38 (1999).

Heidrich et al., "Realistic, Hardware–Accelerated Shading and Lighting," *ACM*, (SIGGRAPH'99), pp. 171–178 (1999).

Hoppe, H., "View–Dependent Refinement of Progressive Meshes", URL: http://www.research.microsoft.com/hoppe/ (10pgs.).

Kumar et al., "Interactive Display of Large Scale NURBS Models", *ACM*, Symp. On Interactive 3D Graphics, pp. 51–58 (1995).

Lake et al., "Stylized Rendering Techniques for Scalable Real–Time 3D Animation", NPAR, pp. 101–108 (2000).

Lander, Jeff, "Making Kine More Flexible," Game Developer Magazine, 5 pgs., Nov. 1998.

Lander, Jeff, "Skin Them Bones," Game Developer Magazine, 4 pgs., May 1998.

Pedersen, "A Framework for Interactive Texturing on Curved Surfaces", *ACM*, pp. 295–301 (1996).

"pmG Introduces Messiah: Animate 3.0", URL: http://www.digitalproducer.com/aHTM/Articles/jul._2000/jul._17_00/pmg_intros_messiah_animate.htm (Accessed Oct. 26, 2004) 2 pgs.

Pueyo, X. et al., "Rendering Techniques '96," Proc. of Eurographics Rendering Workshop 1996, EUROGRAPHICS, pp. 61–70 (1996).

Rockwood, A. et al., "Real–time Rendering of Trimmed Surfaces," Computer Graphics (SIGGRAPH '89 Proceedings) 23:107–116 (1989).

Sousa, M., et al., "Computer–Generated Graphite Pencil Rendering of 3–D Polygonal Models", Eurographics'99, 18(3):C195–C207 (1999).

Stam, J., "Exact Evaluation of Catmull–Clark Subdivision Surfaces at Arbitrary Parameter Values", SIGGRAPH 98 Conference Proceedings, Annual Conference Series, pp. 395–404 (1998).

Taubin et al., "3D Geometry Compression", SIGGRAPH'98 Course Notes (1998).

Wilhelms, J. & Van Gelder, A., "Anatomically Based Modeling,"Univ. California Santa Cruz [online], 1997 [retrieved Dec. 22, 2004], retrieved from the Internet: <URL: http://graphics.stanford.edu/courses/cs448–01–spring/papers/wilhelms.pdf>.

Lewis "Pose Space Deformation: A Unified Approach to Shape Interpolation and Skeleton–Driven Deformation" Centropolis, New Orleans, LA, 165–172.

Lasseter "Principles of Traditional Animation Applied to 3D Computer Animation" Pixar, San Rafael, California, 1987.

Thomas (Contributor) et al., "The Illusion of Life: Disney Animation" 47–51.

Hoppe, "Progressive Meshes" Microsoft Research, 99–108, http://www.research,microsft.com.research/graphics/hoppe/.

Popovic et al., "Progressive Simplicial Complexes" Microsoft Research, http://www.research.microsoft.com/hoppe/.

Hoppe, "Efficient Implementation of progressive meshes" Coput. & Graphics vol. 22, No. 1, pp. 27–36, 1998.

Taubin et al., "Progressive Forest Split Compression" IBM T.J. Watson Research Center, Yorktown Heights, NY.

Cohen–Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195–202.

Chow "Optimized Geometry Compression for Real–time Rendering" Massachusetts Institute of Technology, Proceedings Visualization 1997, Oct. 19–24, 1997, Phoenix, AZ, 347–354.

Markosian "Real-Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet, "Applications of spatial data structures: computer graphics, image processing, and GIS" University of Maryland, Addison–Wesley Publishing Company, 1060–1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

* cited by examiner

RENDERING A THREE-DIMENSIONAL MODEL USING A DITHER PATTERN

TECHNICAL FIELD

This invention relates to rendering a three-dimensional (3D) model using a dither pattern.

BACKGROUND

A 3D model may be defined using 3D volumetric data. 3D volumetric data defines characteristics of models or "objects" in a 3D environment. For example, a 3D environment may include a cloud. 3D volumetric data may be used to define the density of regions of that cloud using dots or other elements.

DESCRIPTION

Figure 1:
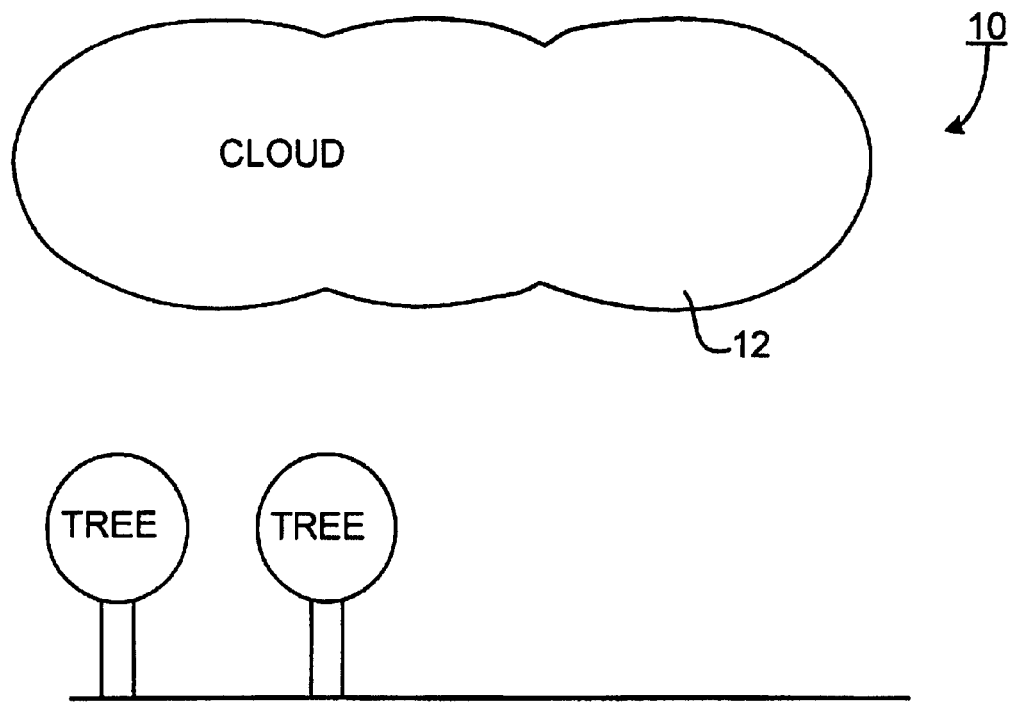
FIG. 1 is perspective view of a 3D environment.
Figure 2:
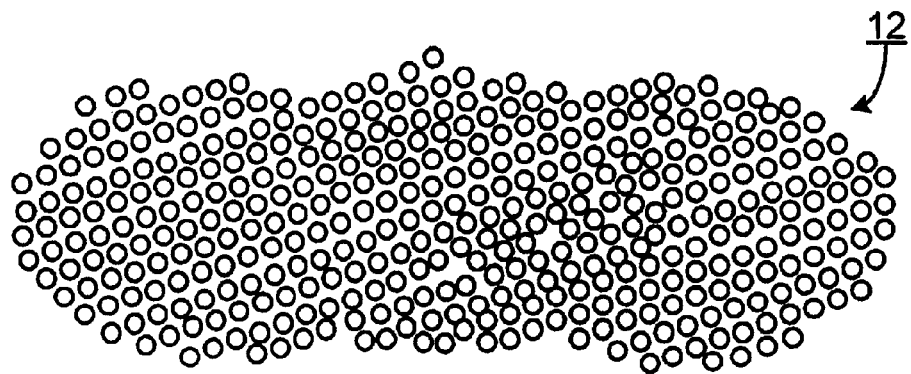
FIG. 2 is a perspective view of volumetric data in an object from the 3D environment.

FIG. 1 shows a 3D environment 10 rendered using 3D data. 3D environment 10 includes a cloud 12. Referring to FIG. 2, the 3D data for cloud 12 is 3D volumetric data. That is, the data defines which pixels are "on" or "off" in the 3D space occupied by cloud 12. In this way, the 3D volumetric data approximates the density of the cloud, i.e., more pixels "on" means higher density, fewer pixels "on" means lower density.

Although density is described here, it is noted that volumetric data is not limited to defining an object's density. Volumetric data may be used to define any characteristic of a 3D model. For example, volumetric data may be used to define color in the three-dimensional model, field strength (e.g., electrical or magnetic) in a 3D model, temperature in the 3D model, and/or pollution concentration in the 3D model.

Figure 3:
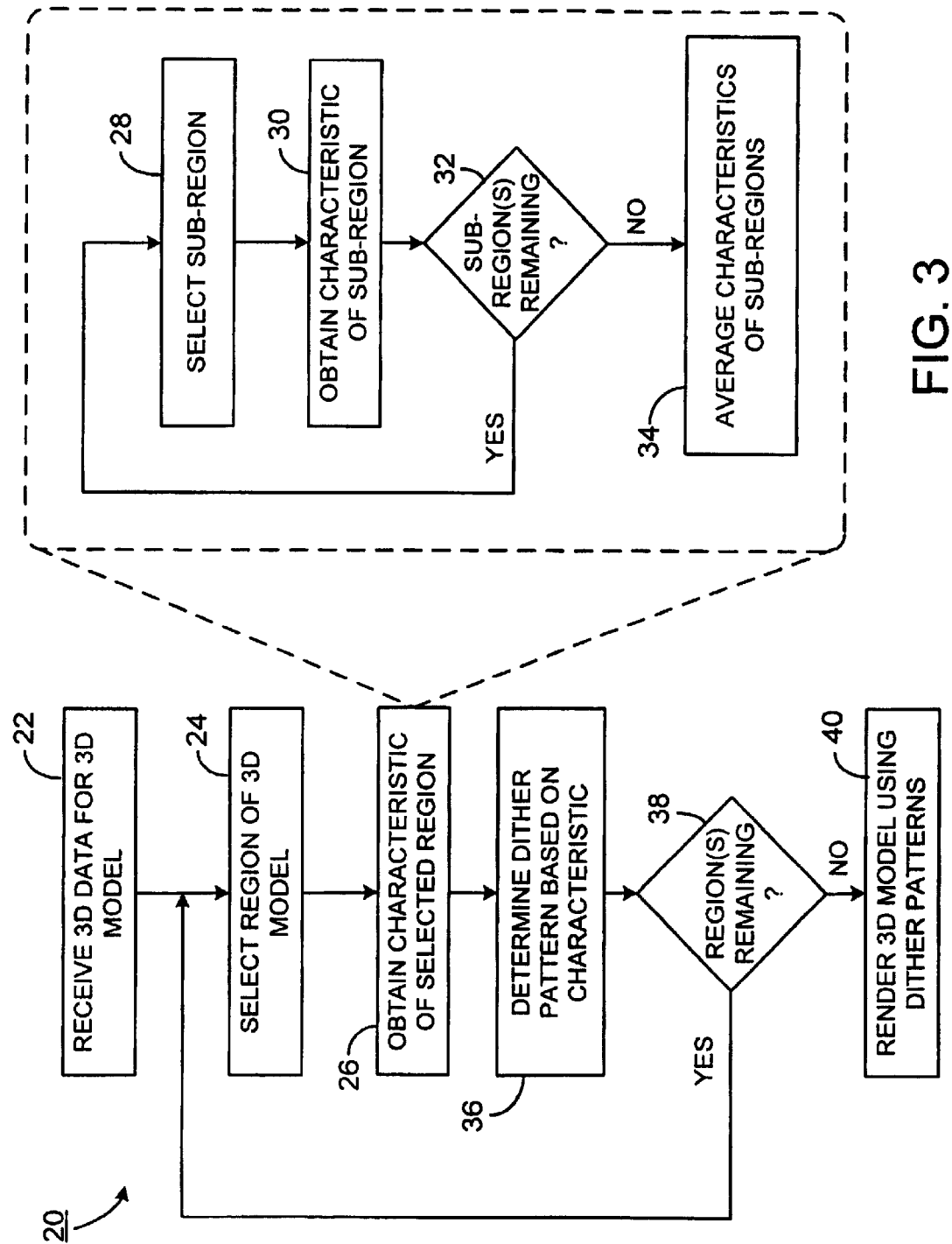
FIG. 3 is a flowchart for rendering a 3D model using one or more dither patterns.

Referring to FIG. 3, a process 20 is shown for rendering a 3D model, such as cloud 12, using 3D dither patterns. Process 20 receives (22) 3D data for 3D model 12. The data may be retrieved from a memory, downloaded from a network, or obtained from any available source. The following describes rendering cloud 12 using 3D dither patterns; however, it is noted that process 20 may be used to render any object in 3D environment 10 using dither patterns (provided, of course, that the object has associated volumetric data).

Process 20 selects (24) a 3D region of cloud 12. In this embodiment, process 20 selects a cubic region; however, any type of 3D region may be used. Irregularly shaped regions may be used, particularly for regions near the boundary of cloud 12. Process 20 obtains (26) a characteristic of the selected region. As noted, the characteristic, in this case density, is defined by volumetric data associated with the selected region. Process 20 obtains (26) the characteristic of the selected region as follows.

Process 20 selects (28) a sub-region of the selected region. The sub-region may be of any shape (e.g., a cube) and any size (e.g., from a single pixel to multiple pixels). Process 20 obtains (30) the desired characteristic, in this case density, of the sub-region. The density is obtained from volumetric data for the sub-region. Process 20 determines (32) if there are any sub-regions for which the density has not been obtained. If so, process 20 repeats blocks 28, 30 and 32 until the density has been obtained for all sub-regions of the region selected in 24. Once the density has been obtained for all sub-regions, process 20 averages (34) the values of the densities. The resulting average is assigned to be the density of the selected region.

Process 20 determines (36) a dither pattern for the selected region based on the density of the selected region. In this embodiment, the dither pattern is defined by data specifying pixels to illuminate in 3D space when rendering cloud 12. The pixels define individual points (or dots) in the dither pattern. The number and locations of the points in the selected region are based on the density of the region. That is, the higher the density, the greater the number of points that are included in the selected region. The points may be distributed randomly throughout the selected region to approximate the density, or they may be distributed evenly. The distribution may determined at the time of rendering, i.e., "on-the-fly", or it may be pre-set. Alternatively, the dither pattern may be selected from a set of pre-stored dither patterns that correspond to various densities.

Once process 20 determines (36) the dither pattern for the selected region, it is determined (38) if there are any regions remaining in cloud 12. That is, process 20 determines (38) if dither patterns have been selected for all regions of cloud 12. If not, process 20 repeats blocks 24, 26, 36 and 38 until dither patterns have been selected for all regions.

Once the dither patterns have been selected, process 20 outputs the dither patterns to a 3D graphics rendering process. The output may be a list of points that comprise the dithered approximation of the volumetric data for cloud 12. The rendering process, which may or may not be part of process 20, renders (40) the 3D object, i.e., the cloud, using the dither patterns. The resulting rendering is a 3D object that approximates its density with concentrations of dots.

Figure 4:
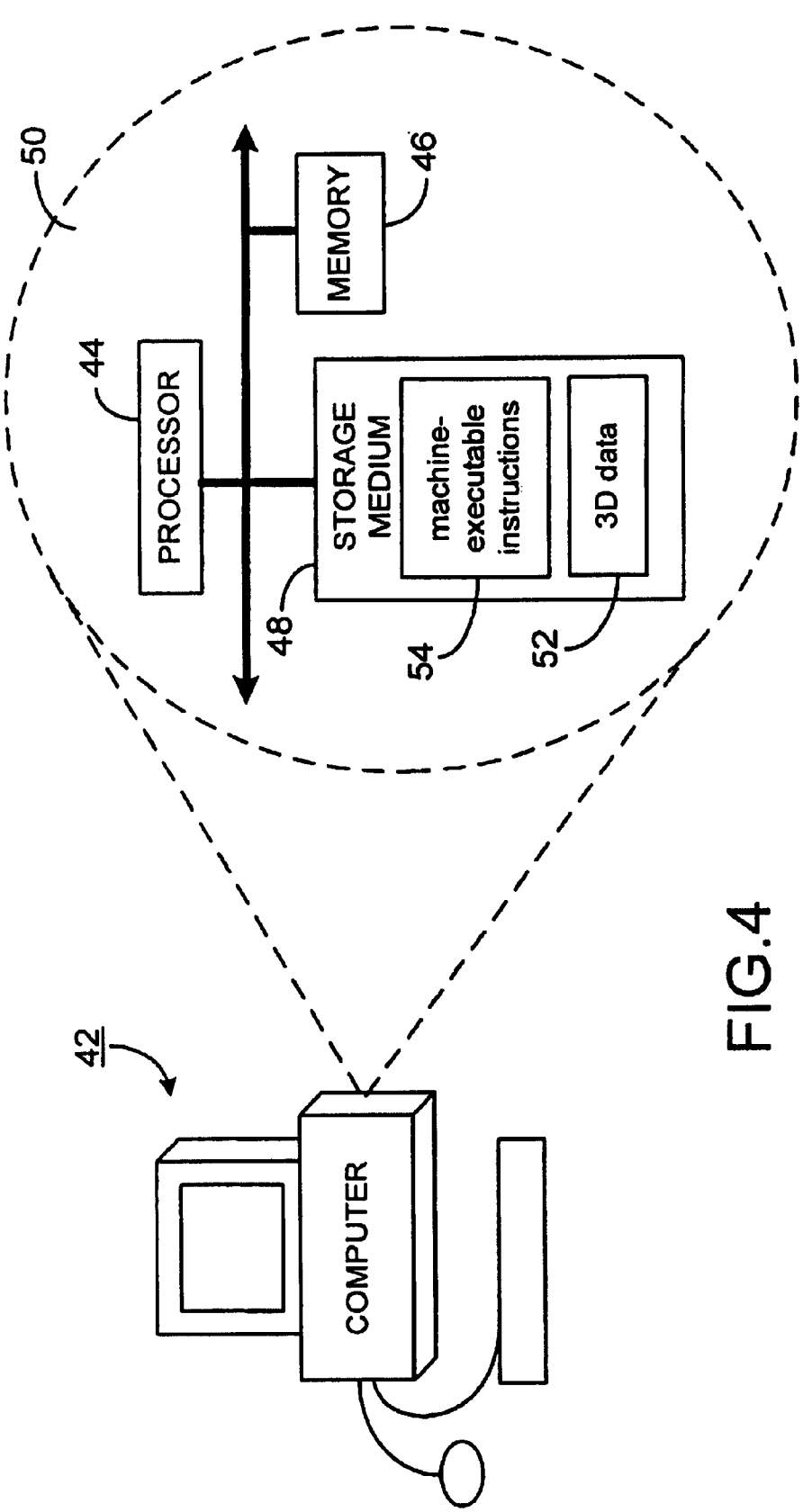
FIG. 4 is a block diagram of computer hardware on which the process of FIG. 3 may be implemented.

FIG. 4 shows a computer 42 on which process 20 may be implemented. Computer 42 includes a processor 44, a memory 46, and a storage medium 48 (see view 50). Storage medium 48 stores 3D data 52 for 3D environment 10 and machine-executable instructions 54 that are executed by processor 44 out of memory 46 to perform process 20 on 3D data 52.

Although a personal computer is shown in FIG. 4, process 20 is not limited to use with the hardware and software of FIG. 4. It may find applicability in any computing or processing environment. Process 20 may be implemented in hardware, software, or a combination of the two. Process 20 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform process 20 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, or magnetic diskette) that is readable by a general or special purpose programmable computer for configuring and operating the computer when the storage medium or device is read by the computer to perform process 20. Process 20 may also be implemented as a machine-readable storage medium, configured with a computer program, where, upon execution, instructions in the computer program cause a machine to operate in accordance with process 20.

The invention is not limited to the specific embodiments described above. Other embodiments not described herein are also within the scope of the following claims.

What is claimed is:

1. A method of rendering a three-dimensional model comprised of volumetric three-dimensional data, comprising:
    obtaining a characteristic of a region of the three-dimensional model;
    determining a three-dimensional dither pattern for the region based on the characteristic, the three-dimensional dither pattern comprising points in a volumetric region, the points being assigned values to make the dither pattern correspond to the characteristic; and
    rendering a dithered version of the three-dimensional model using the three-dimensional dither pattern, wherein the dithered version of the three-dimensional model comprises plural three-dimensional dither patterns, and wherein each of the plural three-dimensional dither patterns corresponds to a non-overlapping region of the three-dimensional model.

2. The method of claim 1, wherein determining comprises selecting a number of points to make up the three-dimensional dither pattern and a location of the points on the three-dimensional model.

3. The method of claim 1, wherein characteristics are obtained for different regions of the three-dimensional model, the plural three-dimensional dither patterns are determined for the different regions based on characteristics for the different regions, and the three-dimensional model is rendered using the plural three-dimensional dither patterns.

4. The method of claim 1, wherein the three-dimensional dither pattern comprises data specifying pixels to illuminate when rendering the three-dimensional model.

5. The method of claim 4, wherein the pixels define individual points in the three-dimensional dither pattern.

6. The method of claim 1, wherein the characteristic comprises a density of the three-dimensional model.

7. The method of claim 6, wherein the density is obtained for a three-dimensional region of the three-dimensional model by averaging densities of sub-regions within the three-dimensional region.

8. The method of claim 1, wherein the characteristic comprises one of a color of the three-dimensional model, a field strength in the three-dimensional model, a temperature in the three-dimensional model, and a pollution concentration in the three-dimensional model.

9. The method of claim 1, wherein determining the three-dimensional dither pattern comprises selecting the three-dimensional dither pattern from a number of three-dimensional dither patterns stored in memory.

10. An article comprising a machine-readable medium that stores executable instructions for rendering a three-dimensional model comprised of volumetric three-dimensional data, the instructions causing a machine to:
    obtain a characteristic of a region of the three-dimensional model;
    determine a three-dimensional dither pattern based for the region on the characteristic, the three-dimensional dither pattern comprising points in a volumetric region, the points being assigned values to make the dither pattern correspond to the characteristic; and
    render a dithered version of the three-dimensional model using the three-dimensional dither pattern, wherein the dithered version of the three-dimensional model comprises plural three-dimensional dither patterns, and wherein each of the plural three-dimensional dither patterns corresponds to a non-overlapping region of the three-dimensional model.

11. The article of claim 10, wherein determining comprises selecting a number of points to make up the three-dimensional dither pattern and a location of the points on the three-dimensional model.

12. The article of claim 10, wherein characteristics are obtained for different regions of the three-dimensional model, the plural three-dimensional dither patterns are determined for the different regions based on characteristics for the different regions, and the three-dimensional model is rendered using the plural three-dimensional dither patterns.

13. The article of claim 10, wherein the three-dimensional dither pattern comprises data specifying pixels to illuminate when rendering the three-dimensional model.

14. The article of claim 13, wherein the pixels define individual points in the three-dimensional dither pattern.

15. The article of claim 10, wherein the characteristic comprises a density of the three-dimensional model.

16. The article of claim 15, wherein the density is obtained for a three-dimensional region of the three-dimensional model by averaging densities of sub-regions within the three-dimensional region.

17. The article of claim 10, wherein the characteristic comprises one of a color of the three-dimensional model, a field strength in the three-dimensional model, a temperature in the three-dimensional model, and a pollution concentration in the three-dimensional model.

18. The article of claim 10, wherein determining the three-dimensional dither pattern comprises selecting the three-dimensional dither pattern from a number of three-dimensional dither patterns stored in memory.

19. An apparatus for rendering a three-dimensional model comprised of three-dimensional volumetric data, comprising:
    a memory that stores executable instructions; and
    a processor that executes the instructions to:
       obtain a characteristic of a region of the three-dimensional model;
       determine a three-dimensional dither pattern for the region based on the characteristic, the three-dimensional dither pattern comprising points in a volumetric region, the points being assigned values to make the dither pattern correspond to the characteristic; and
       render a dithered version of the three-dimensional model using the three-dimensional dither pattern, wherein the dithered version of the three-dimensional model comprises plural three-dimensional dither patterns, and wherein each of the plural three-dimensional dither patterns corresponds to a non-overlapping region of the three-dimensional model.

20. The apparatus of claim 19, wherein determining comprises selecting a number of points to make up the three-dimensional dither pattern and a location of the points on the three-dimensional model.

21. The apparatus of claim 19, wherein characteristics are obtained for different regions of the three-dimensional model, the plural three-dimensional dither patterns are determined for the different regions based on the characteristics for the different regions, and the three-dimensional model is rendered using the plural three-dimensional dither patterns.

22. The apparatus of claim 19, wherein the three-dimensional dither pattern comprises data specifying pixels to illuminate when rendering the three-dimensional model.

23. The apparatus of claim 22, wherein the pixels define individual points in the three-dimensional dither pattern.

24. The apparatus of claim 19, wherein the characteristic comprises a density of the three-dimensional model.

25. The apparatus of claim 24, wherein the density is obtained for a three-dimensional region of the three-dimensional model by averaging densities of sub-regions within the three-dimensional region.

26. The apparatus of claim 19, wherein the characteristic comprises one of a color of the three-dimensional model, a field strength in the three-dimensional model, a temperature in the three-dimensional model, and a pollution concentration in the three-dimensional model.

27. The apparatus of claim 19, wherein determining the three-dimensional dither pattern comprises, selecting the three-dimensional dither pattern from a number of three-dimensional dither patterns stored in memory.

* * * * *